(12) United States Patent
Moss

(10) Patent No.: US 6,985,985 B2
(45) Date of Patent: Jan. 10, 2006

(54) METHODS AND STRUCTURE FOR DYNAMIC MODIFICATIONS TO ARBITRATION FOR A SHARED RESOURCE

(75) Inventor: Robert W. Moss, Longmont, CO (US)

(73) Assignee: LSI Logic Corporation, Milpitas, CA (US)

( * ) Notice: Subject to any disclaimer, the term of this patent is extended or adjusted under 35 U.S.C. 154(b) by 398 days.

(21) Appl. No.: 10/164,332

(22) Filed: Jun. 5, 2002

(65) Prior Publication Data

US 2003/0229744 A1    Dec. 11, 2003

(51) Int. Cl.
 *G06F 12/00* (2006.01)
(52) U.S. Cl. .................. 710/240; 710/241; 710/244
(58) Field of Classification Search ........... 710/36, 710/38, 40, 44, 107, 111, 113, 116, 119–123, 710/240–244; 340/825.5, 825.51
See application file for complete search history.

(56) References Cited

U.S. PATENT DOCUMENTS

| | | | | |
|---|---|---|---|---|
| 6,073,132 A | * | 6/2000 | Gehman | 707/9 |
| 6,411,218 B1 | * | 6/2002 | Johnson | 340/825.5 |
| 6,691,193 B1 | * | 2/2004 | Wang et al. | 710/200 |
| 6,728,789 B2 | * | 4/2004 | Odenwald et al. | 710/3 |

* cited by examiner

Primary Examiner—Khanh Dang
(74) Attorney, Agent, or Firm—Duft Bornsen & Fishman, LLP

(57) ABSTRACT

Methods and structure for enhanced flexibility in bus arbitration without requiring modification to a standard arbiter circuit. Parameters for determining the priority of each channel involved in the arbitration are provided to a computational element to apply predicate functions thereto and thereby generate an index value. The index value is then used to access the lookup table for that channel to determine the present priority of the channel in an arbitration structure. The use of a lookup table permits simple modification to the arbitration structure for a particular application. The predicate evaluation of selected parameters further enhances flexibility in adapting the arbitration structure to the requirements of a particular application.

16 Claims, 3 Drawing Sheets

METHODS AND STRUCTURE FOR DYNAMIC MODIFICATIONS TO ARBITRATION FOR A SHARED RESOURCE

BACKGROUND OF THE INVENTION

1. Field of the Invention

The present inventions relates to bus arbitration and in particular to a bus arbitration method and structure for using lookup tables for determining and applying parameters of arbitration for control of a shared resource.

2. Related Patents

This patent is related to commonly owned U.S. patent application Ser. No. 10/162,960, filed 5 Jun. 2002, entitled METHODS AND STRUCTURE FOR IMPROVED FAIRNESS BUS ARBITRATION and is related to commonly owned U.S. patent application Ser. No. 10/164,240, filed 5 Jun. 2002, entitled METHODS AND STRUCTURE FOR STATE PRESERVATION TO IMPROVE FAIRNESS IN BUS ARBITRATION, both of which are hereby incorporated herein by reference.

3. Discussion of Related Art

It is generally known in electronic systems to have multiple devices communicating over a shared electronic bus. In general, a first device (usually referred to as a master device) initiates an exchange of information with a second device (usually referred to as a slave device). It is also generally known in the art that a bus structure may permit multiple master devices and multiple slave devices to exchange information. Generally, one master device communicates with one or more slave devices to the exclusion of other master and slave devices in the system. In such a circumstance, a first master device desiring use of the bus for communication with a slave device must first obtain temporary exclusive control over the shared bus structure. A master device obtains temporary exclusive control of the shared bus by requesting the bus structure and awaiting an acknowledgment signal indicative of granting of the requested temporary exclusive access to the shared bus.

Typically, an arbiter device coupled to the shared bus structure receives a request for temporary exclusive control of the bus from each of several master devices and selects the next master device to obtain the requested temporary exclusive control. The arbiter receives request signals and returns grant (acknowledgment) signals to master devices to indicate request and granting of temporary exclusive control, respectively. This process is typically referred to as the bus arbitration. A number of well-known commercially applied bus structures support such multiple master devices sharing control of a bus. Though the specific timing and signals involved in arbitration may vary, all such buses support arbitration in some form.

It is common in the art for an arbiter device to utilize any of several well-known techniques for determining the next requesting master device to be granted temporary exclusive control of the shared bus structure. One simple technique is often referred to as "round-robin" in that each device may be granted temporary exclusive control of the shared bus in sequential order defined by an index number—usually a master device ID. When the last master device ID is granted temporary exclusive control over the bus, the first master device is again eligible for exclusive bus control. This sequential "round-robin" technique assures that each master device has a roughly equal opportunity to obtain temporary exclusive control of the shared bus structure.

Another common bus arbitration technique is to assign a priority to each master device. At any given point, a master device with the highest priority requesting temporary exclusive control of the shared bus will be granted control over the bus. Still other techniques combine features of both a priority-based scheme and round-robin arbitration techniques. For example, each master device may be assigned a priority and all master devices having the same particular priority level share the bus using a round-robin technique.

Strict round-robins arbitration generally provides equal access to the shared bus for all master devices. Standard priority-based bus arbitration algorithms are effective at assuring that the highest priority master devices can rapidly access the shared bus as compared to lower priority devices. However a problem with priority-based scheme is that the lowest priority devices may be effectively "starved" from access to the bus due to high frequency bus requests by higher priority master devices. By contrast, round-robin arbitration techniques preclude high priority master devices from obtaining necessary frequent access to a shared bus.

Hybrid techniques, as noted above, that combine features of both round-robin arbitration and priority-based arbitration still produce unfair results in some circumstances. For example, presume a plurality of master devices are requesting the bus all at the same first priority level (i.e., applying round-robin techniques within that priority level). A higher priority master device then requests and is granted the bus (since it is a higher priority than the plurality of devices at the first priority level). When the higher priority device relinquishes the bus, the plurality of devices at the first priority level again arbitrate using round-robin techniques.

The particular arbitration structures and methods appropriate to a system are determined by a system designer with consideration of parameters and circumstances of the particular system. Present arbitration techniques are generally algorithmic in nature and thus implemented as circuits performing a fixed function determined by the designer of the arbiter. This presents a problem where it is desirable to modify parameters of the arbitration technique after the arbiter is designed. Such changes require modification to the arbiter circuit design to modify the desired functionality of the arbiter. Further, it may be desirable to modify parameters of the arbitration process in response to measurement of operation of the system. Such dynamic alterations are not possible in present arbiter designs where a fixed circuit determines all parameters of the arbitration process.

It is evident from the above discussion that a need exists for improved flexibility in designing arbitration processes and in particular a need exists to enable flexible, dynamic alterations to arbitration processes in a system.

SUMMARY OF THE INVENTION

The present invention solves the above and other problems, thereby advancing the state of the useful arts, by providing an arbiter structure and associated arbitration methods that are easily modified. Parameters of the arbitration process are defined by table entries. An appropriate table entry is selected based on status of selected predicates evaluated within the system. Predicates are defined that evaluate common attributes and signals of a system design. Each predicate evaluates to a binary encoded value comprising one or more binary values. The binary values are selected for each master device (also referred to herein as "channel") participating in the arbitration structure and process. The present binary values of the selected predicates are then combined to form an index into a lookup table to determine the associated channel's priority in a priority-based arbitration circuit. The lookup table may be stored in any suitable memory structure including register or latch arrays or standard memory components such as RAM or ROM.

The table lookup feature allows the dynamic adjustment of priorities for channels involved in the arbitration process. Modification of the table entries obviates the need for re-design of the arbiter circuit or the associated system board to accommodate changes in the arbitration structure and logic for the system. Simple alteration of the selection of predicates for each channel permits further flexibility in the design of a system without requiring changes to the arbiter circuit design per se.

The improved flexibility realized in application of the structures and methods of the present invention enhances the re-usability of a standard arbiter circuit design. A standardize arbiter circuit may be re-used in numerous applications by simply modifying the parameter selections and modifying the contents of the lookup table.

A first feature of the invention therefore provides an apparatus in a system having a shared resource shared by multiple channels, the apparatus comprising: an index value generator associated with each channel of the multiple channels for determining an index value from input signals associated with the system; a lookup table associated with each channel and coupled to the index value generator for generating an arbitration priority value associated with the index value; and an arbiter coupled to each lookup table associated with each channel to arbitrate for control of the shared resource among the multiple channels in accordance with the arbitration priority values generated by each the lookup table.

Another aspect of the invention further provides that the index value generator comprises: a predicate selector for selecting predicates to be applied to the input signals; and a predicate evaluator for evaluating selected predicates by applying the input signals to the selected predicates.

Another aspect of the invention further provides a second signal source for generating a second signal value, such that the predicate evaluator generates the binary value as a function of the input signal and the second signal value.

Another aspect of the invention further provides that the second signal source comprises: a memory for storing the second signal value.

Another aspect of the invention further provides that the lookup table comprises a register array and such that the index value selects a corresponding register of the register array.

Another aspect of the invention further provides that the lookup table comprises a latch array and such that the index value selects a corresponding latch of the latch array.

Another aspect of the invention further provides that the lookup table comprises a memory and such that the index value accesses a corresponding location of the memory.

Another feature of the invention therefore provides a system comprising: a shared resource; a plurality of channels; an arbiter coupled to each of the plurality of channels and coupled to the shared resource to coordinate access by the plurality of channels to the shared resource such that the arbiter includes: a predicate computation element associated with each channel of the plurality of channels for determining an index value for each channel based on attributes of the system; and a channel selection element coupled to each the predicate computation element to select a next channel to be granted access to the shared resource based on the index value for each channel.

Another aspect of the invention further provides that the arbiter further includes: a lookup table coupled between each the predicate computation element and the channel selection element to translate the index value determined by each the predicate computation element to a priority value, such that the channel selection element selects the next channel based on the priority value of each the channel.

Another feature of the invention provides a method in a system having an arbiter coupling a plurality of channels to a shared resource to coordinate access to the shared resource by the plurality of channels, the method for improved flexibility in arbitration comprising the steps of: evaluating at least one attribute of the system; determining an index value for each channel of the plurality of channels according to a predicate function of the at least one attribute; and selecting a next channel of the plurality of channels to receive access to the shared resource in accordance with each the index value.

Another aspect of the invention further provides that the step of evaluating includes the step of: detecting signal values within the system.

Another aspect of the invention further provides that a predicate function is associated with each channel of the plurality of channels and such that the step of determining comprises the step of: determining an index value for each channel according to a predicate function corresponding to each channel.

Another aspect of the invention further provides that the step of: using the index value with a lookup table to determine a priority value corresponding to the index value, such that the step of selecting comprises the step of: selecting the next channel in accordance with each the priority value.

Another aspect of the invention further provides that the system includes a plurality of predicate functions and such that the method further comprises: selecting a predicate function for each channel, such that the step of determining comprises the step of: determining the index value according to the selected predicate function.

DETAILED DESCRIPTION OF THE PREFERRED EMBODIMENTS

Figure 1:
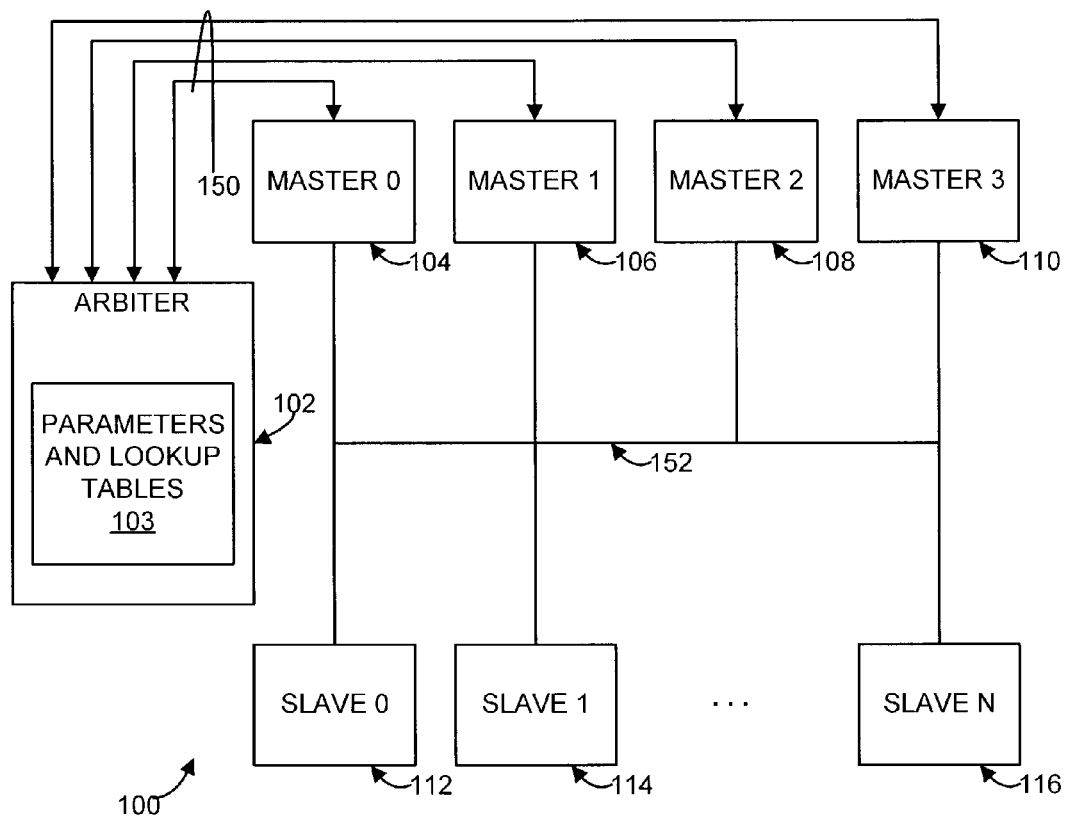
FIG. 1 is a block diagram of a system using an arbiter in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a system 100 having multiple master devices 104 through 110 and multiple slave devices 112 through 116 (shared resources) coupled to a shared system bus 152. Arbiter 102 includes the improvements of the present invention as parameters and associated lookup tables 103 used to flexibly define the operation of the arbiter. Those of ordinary skill in the art will recognize that slave devices 112 through 116 represent any shared resource in such a system. For example, a shared resource may be an I/O controller device coupled to a bus such that a master device must obtain temporary exclusive control of the bus and controller as a shared resource. Or, for example, the shared resource may be a memory controller for controlling a memory subsystem coupled through the memory controller to a plurality of master devices. Numerous other examples of slave devices (shared resources) will be readily apparent to those of ordinary skill in the art.

Request and grant signals associated with each master device 104 through 110 are exchanged with arbiter 102 via bus 150. In general, each master device 104 through 110 (also referred to herein as "channels") requests temporary exclusive control of bus 152 by applying a bus request signal to its associated signal path of bus 150. The arbiter 102 receives all such bus request signals from all master devices 104 through 110 and selects the next master device presently requesting temporary exclusive ownership of bus 152 to which the requested ownership will be granted. A grant signal is applied to an associated signal path of bus 150 to grant the request of the next selected master device.

As noted above, any of several well-known arbitration techniques may be used within arbiter 102. In a priority-based arbitration architecture, each master devices is associated with a particular priority level. When multiple master devices simultaneously request temporary ownership of bus 152, arbiter 102 selects the highest priority such requesting master device to receive the requested temporary exclusive ownership of bus 152.

As noted above, in such a priority-based arbitration architecture, the association of a device with a priority level is typically selected by the designer at the time of the system design. Design considerations include a number of factors whereby a designer determines the appropriate prioritization of the various channels (master devices). Further as noted above, modifications to such a fixed arbitration architecture are difficult in that they require re-design of the arbiter circuit and potentially changes to the system board. A more flexible architecture is provided by the present invention wherein parameters involved in prioritization determinations, predicates to evaluate the parameters and priority values resulting from such evaluations may be dynamically selected and altered by a designer without requiring re-design of the arbiter circuits or system board.

Those skilled in the art will recognize that the architecture depicted in FIG. 1 is intended as exemplary of a wide variety of bus architectures that may benefit from the improved fairness techniques and structure of the present invention. In particular, those skilled in the art will recognize that any number of master devices may be used in conjunction with such a system structure limited only by the specifications of the particular system bus selected by the designer. Further, any number of slave devices (shared resources), limited only by the requirements and specifications of the selected system bus, may be present in such a system 100.

Still further, those of ordinary skill in the art will recognize that any of several well-known system bus architectures may be selected for a system bus 152 and arbitration signals on bus 150. In particular, in one exemplary preferred embodiment, bus 150 and 152 together may be an AMBA AHB compliant high-performance system bus architecture. A number of other common, commercial bus structures as well as customized proprietary bus structures may also benefit from the features of the present inventions. Those skilled in the art will further recognize that signals applied to bus 150 and system bus 152 are typically integrated in a single bus structure rather than two distinct bus structures as depicted in FIG. 1. Signals applied to bus 150 are shown in FIG. 1 as separate from system bus 152 only to simplify the description in that signals applied to bus 150 relate exclusively to bus arbitration processing to exchange signals between master devices 104 through 110 and arbiter 102.

Figure 2:
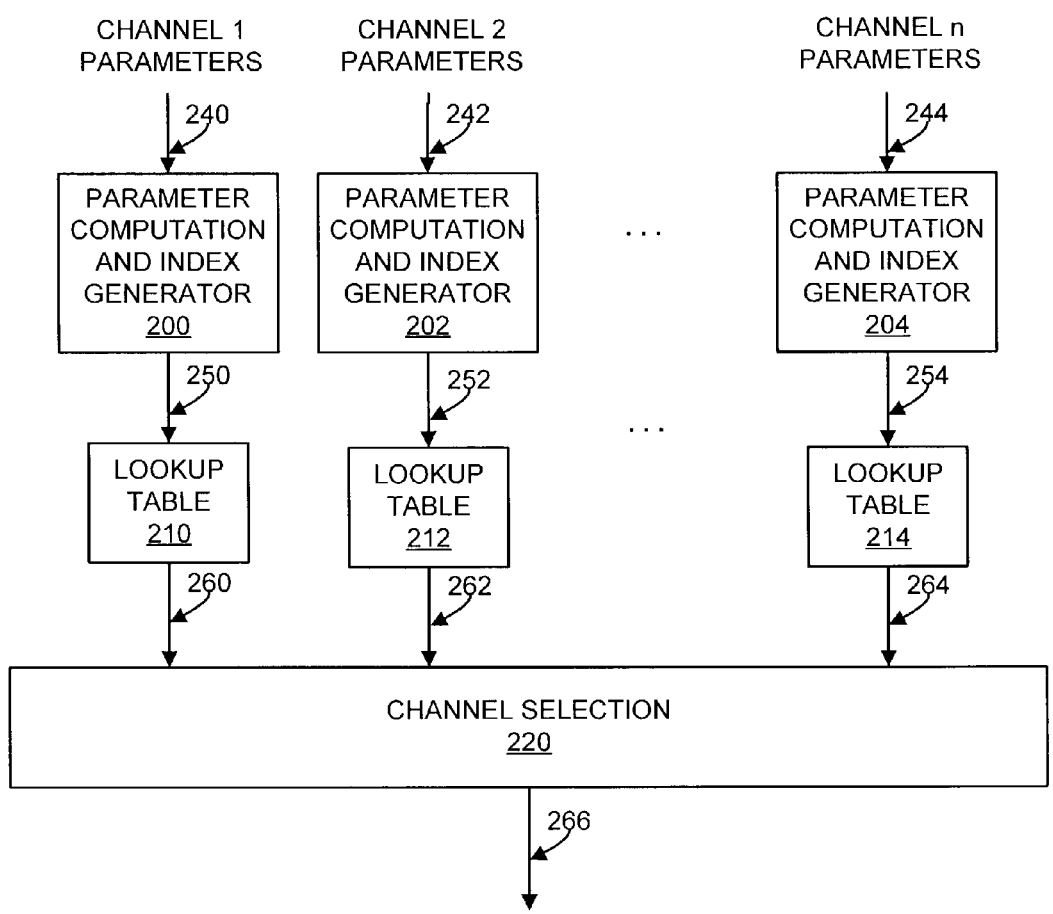
FIG. 2 is a block diagram providing additional details of the features of the present invention providing more flexible definition of arbitration parameters and operation.

FIG. 2 is a block diagram providing additional details of an exemplary preferred embodiment of the present invention for enhancing flexibility in application of a priority-based arbiter. Parameters associated with determining the priority for each channel are provided as inputs to the enhanced arbiter. The particular parameters of a particular arbiter application will be specific to that system. Numerous examples of signals relevant to determining priority of a channel will be readily apparent to those of ordinary skill in the art. Exemplary of such parameter signals might be FIFO status where a channel includes a FIFO for exchanging data with the shared resource controlled by the arbiter (i.e., FIFO full, FIFO empty, FIFO near full, etc.). Other examples might include the memory bank presently active where the shared resource managed by the arbiter is a memory device having multiple banks of memory. The presently active bank of memory may be an important factor in adjusting the priority of channels participating in arbitration for control of the shared memory resource. Such dynamic adaptation of the priorities may be beneficial in an arbitration structure to favor a channel that is requesting access to the same presently active bank of the shared memory resource.

Parameters pertaining to channel 1 are applied as signals on path 240. Parameter computation and index generator element 200 receives all such parameters associated with determining the priority of channel 1 and determines an index value from the present value of the parameter signals applied to input path 240. The index value so determined is applied via path 250 to lookup table 210 which, in turn, selects a priority value from a lookup table location identified by the index value. The priority value so determined from lookup table 210 is then applied via path 260 to channel selection element 220. Channel selection element 220 may use any of several well-known techniques to select a channel, including strict priority encoding as well as priority in combination with other techniques such as round-robin or improved fairness techniques as described in related patent applications incorporated herein by reference. In preferred embodiments, the priority related values determined by operation of elements 200 and 210 are used as at least one input to the channel selection processing of element 220.

Parameter computation and index generator element 202 similarly receives parameters on path 242 and determines an index value applied via path 252 to lookup table 212. Lookup table 212 then applies a present priority value derived from the lookup table location so identified and applies the priority value via path 260 to channel selection 220. In like manner parameters associated with Channel "n" are applied to path 244 as input to parameter computation and index generator element 204. The index value to so determined by element 204 is then applied via path 254 as an input to lookup table 214. Lookup table 214 then selects the identified priority value and applies it as an output on path 264 for processing by channel selection 220. Channel selection 220 receives the priority values for each channel, selects the channel indicating the highest priority and applies the selected channel identifier to path 266 for further processing within the arbiter.

Details of the structure of a parameter computation and index generator elements 200, 202 and 204 is provided further herein below with respect to the FIG. 3. Lookup table 210, 212 or 214 may be implemented as any of several equivalent structures including, a register array, a latch array, or a memory device including, for example, a RAM or ROM memory component. An index value applied to the lookup table structure (210, 212 or 214) selects an element within the lookup table containing a priority value corresponding to the generated index value. Where lookup table 210, 212 or 214 is implemented as a register array or latch array, the index value applied as an input to the lookup table directly selects one of the various registers or latches. The priority value stored in the selected register or latch is then applied as the output of the corresponding lookup table element (210, 212 or 214). Where lookup table 210, 212 or 214 is implemented as a standard memory component (i.e., a RAM or ROM memory element), the index value generated and applied as an input to the lookup table is used as a memory location to retrieve the priority value stored in the addressed memory element.

Those of ordinary skill in the article readily recognize a variety of lookup table structures that may be used in conjunction with the present invention. Further, those of ordinary skill in the art will recognize a variety of priority encoding techniques to receive the priority values associated with each of the channels participating in the arbitration and for selecting an appropriate channel for granting of access to the shared resource. Details of such a priority encoder and other aspects of a priority-based arbiter are well-known to those of ordinary skill in the art. Exemplary priority encoding schemes and arbiter structures are presented in the related applications incorporated herein.

Further, those of ordinary skill in the art will recognize that any number of channels may be associated with such an architecture as required for a particular system application. Still further, any number of parameters may be associated with the parameter computation and index generation elements 200, 202 and 204. FIG. 2 is therefore intended merely as representative of a wide variety of equivalent embodiments of such an architecture providing flexible definition of arbitration parameters and priority determinations therefrom.

Figure 3:
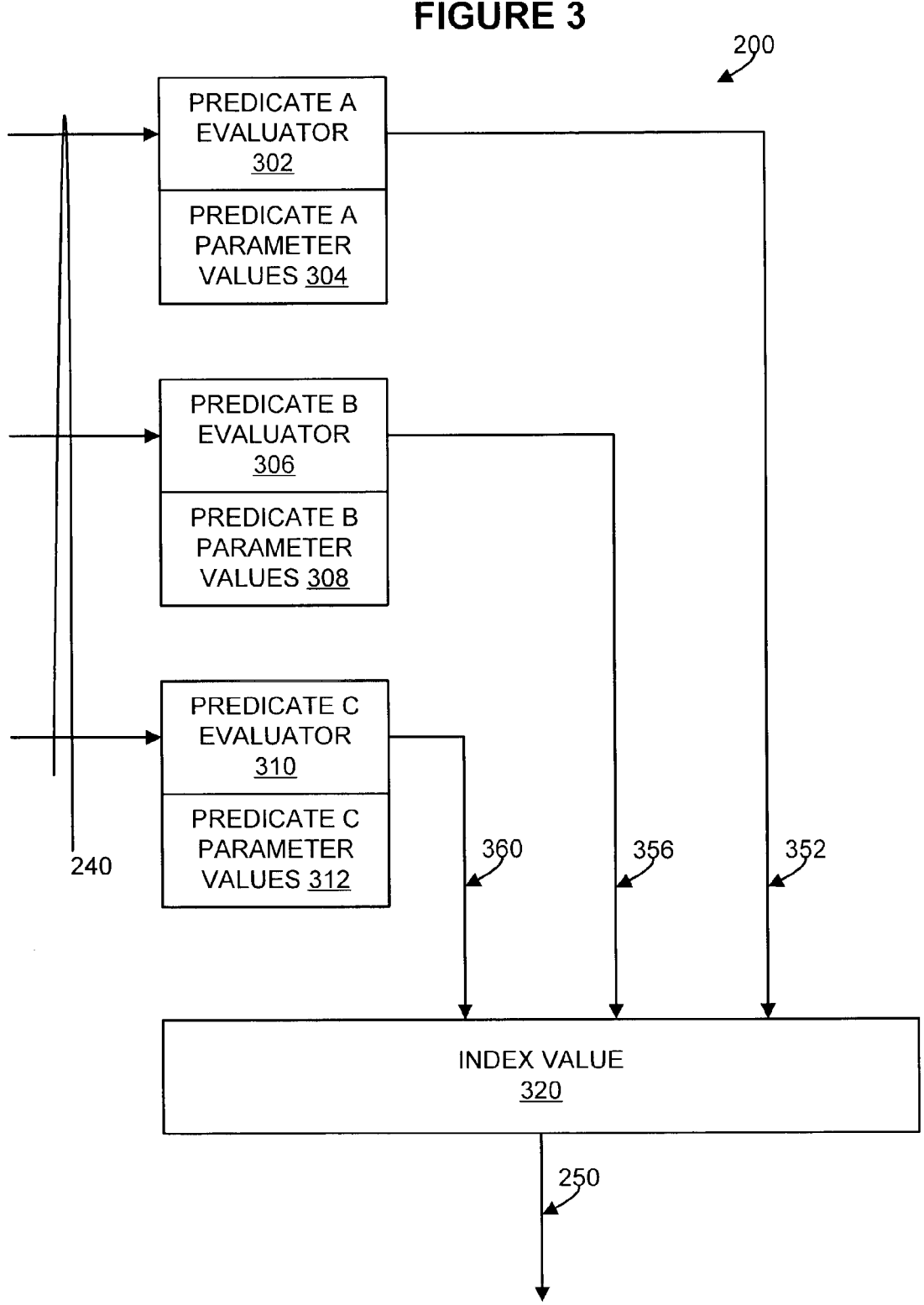
FIG. 3 is a block diagram providing additional details of the structure of an exemplary preferred embodiment of a parameter computation and index generation element of FIG. 2.

FIG. 3 is a block diagram providing additional details of the structure of a parameter computation and index generation element (200, 202 or 204 of FIG. 2). Predicate A evaluator 302 applies parameter signals received on path 240 to the first predicate (predicate A) for evaluating the applied parameters and generating and output index value. As discussed further herein below, a predicate may be any desired function to evaluate a received input parameter value. Numerous examples of typical predicate evaluations are provided further herein below.

The index value generated by evaluation of predicate A evaluator 302 is applied via path 352 to form a portion of index value 320. If the evaluation of the predicate defined by predicate A evaluator 302 requires additional parameter values, such parameter values are supplied by element 304 associated with evaluator 302. These other parameter values may include constant or threshold values used for comparison with input parameter signals in evaluating the predicate. As noted above, such parameter values may be stored in a programmable element so that parameter values may be adapted dynamically in response to operation of the system. Examples of such other parameter values are discussed herein below along with exemplary predicate evaluations.

In like manner, predicate B evaluator 306 applies input signals from path 240 to a defined predicate for generating an index value applied to output path 356 (forming a second portion of index value 320). As above, additional parameter values stored in element 308 may be used by predicate B evaluator 306 to generate the output index value. Similarly, predicate C evaluator 310 evaluates input signals on path 240 along with other parameter values retrieved from element 312 to generate an index value applied to path 360.

Index value 320 applies the concatenated partial index values generated by predicate evaluators 302, 306 and 310 to generate a composite index value 320 for application to path 250 and, in turn, for application to an associated lookup table as discussed above.

Those of ordinary skill in the art will readily recognize that any number of predicates may be associated with such a parameter computation and index generator element 200. Further, those of ordinary skill in the art will recognize that the output index value generated by each predicate evaluator may be a single bit value (i.e., a Boolean value) or may be a multi-bit value representing additional portions of the index value.

Typical predicates include the ability to test input parameter signals applied to the predicate evaluator against other values or against any arbitrary Boolean or arithmetic function. Examples of such predicates that may be useful in a variety of systems include:

Exemplary predicate "A"

OUTPUT VALUE←input bit vector==constant

This exemplary predicate compares an input parameter bit vector against a constant parameter. The arbitrary constant parameter value is preferably retrieved from the parameter storage element associated with the predicate evaluator for this predicate.

Exemplary predicate "B"

OUTPUT VALUE←input bit vector>threshold

This exemplary predicate compares an input parameter bit vector against a threshold parameter. The arbitrary threshold parameter value is preferably retrieved from the parameter storage element associated with the predicate evaluator for this predicate.

Exemplary predicate "C"

OUTPUT VALUE←input bit

This exemplary predicate returns the state of the input bit signal as its output value.

Exemplary predicate "D"

OUTPUT VALUE←combinatorial function of input signals 1 . . . x

This exemplary predicate returns a combinatorial logic function applied to any number of input signal values. The logic function may be any combinatorial logic function useful for the arbiter application.

Exemplary predicate "E"

OUTPUT VALUE←input bit vector

This exemplary predicate returns the state of the input bit vector signal as its output value. The input vector may be for example a state vector or a counter value.

Those of ordinary skill in the art will readily recognize a wide variety of predicate functions such as those described above for use in particular system applications. In essence, any evaluation function that may be implemented in combinatorial logic may be implemented as a predicate to be applied to a set of input signals to generate a corresponding output signal.

Using exemplary predicates as described above, the following describes a simple exemplary system applying the features of the present invention to enhance flexibility in arbiter design. In the following two channel example, it should be assumed that the desired arbiter function would perform a function algorithmically described as follows:

```
if (channel 2 input vector "B" > threshold "B") // predicate "B"
    select channel 2
else
    if (channel 1 bit vector "A" == constant "A") // predicate "A"
        select channel 1
    else
        if (channel 2 bit "C") // predicate "C"
            select channel 2
        else if (channel 1 signal "C") // predicate "C"
            select channel 1
        endif
    endif
endif
```

Expressed using the index generation and lookup table structures of the present invention, the index generation would generate a 2-bit index value (channel_1_index[1:0] and channel_1_index[1:0]) as follows:
  channel_1_index[0] ← input bit A == constant A (apply predicate "A")
  channel_1_index[1] ← input signal C (apply predicate "C")
  channel_2_index[0] ← input signal B > threshold B (apply predicate "B")
  channel_2_index[1] ← input signal C (apply predicate "C")

The lookup tables for this example would appear as follows:

|                        | Output Priority |
|------------------------|-----------------|
| Applied Index Channel 1 |                |
| 00                     | 1               |
| 01                     | 3               |
| 10                     | 1               |
| 11                     | 3               |
| Applied Index Channel 2 |                |
| 00                     | 2               |
| 01                     | 4               |
| 10                     | 2               |
| 11                     | 4               |

Those of ordinary skill in the art will recognize that the above example is not intended to limit the invention to a particular arbitration application. Rather, a wide variety of arbitration applications may be encoded into the structures and methods of the present invention.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a system having a shared resource shared by multiple channels, an apparatus comprising:
   an index value generator associated with each channel of said multiple channels for determining an index value from input signals applied to the index value generator, wherein the input signals are generated within the system and are representative of parameters associated with present operation of said each channel;
   a lookup table associated with said each channel and coupled to said index value generator for generating an arbitration priority value associated with said index value wherein the lookup table has multiple entries each storing an arbitration priority value and each associated with a corresponding index value such that application of said index value to the lookup table selects one of the multiple entries to thereby generate said arbitration priority value; and
   an arbiter coupled to each said lookup table associated with said each channel to arbitrate for control of said shared resource among said multiple channels in accordance with the arbitration priority values generated by each said lookup table.

2. The apparatus of claim 1 wherein said index value generator comprises:
   a predicate evaluator adapted to receive the input signals for evaluating selected predicates by applying said input signals to the selected predicates to generate said index value.

3. The apparatus of claim 2 wherein said predicate evaluator generates a binary value.

4. The apparatus of claim 3 wherein said predicate evaluator generates a single bit binary value.

5. The apparatus of claim 3 wherein said predicate evaluator generates a multiple bit binary value.

6. The apparatus of claim 2 further comprising:
   a second signal source coupled to the predicate evaluator for generating a second signal value applied to said predicate evaluator,
   wherein said predicate evaluator generates said index value as a function of said input signals and said second signal value.

7. The apparatus of claim 6 wherein said second signal source comprises:
   a memory for storing said second signal value.

8. The apparatus of claim 1 wherein said lookup table comprises a register array wherein each register of the register array stores a corresponding entry of the multiple entries of the lookup table and wherein said index value is applied as a selection input to the latch array to select a corresponding register of said register array.

9. The apparatus of claim 1 wherein said lookup table comprises a latch array wherein each latch of the latch array stores a corresponding entry of the multiple entries of the lookup table and wherein said index value is applied as a selection input to the latch array to select a corresponding latch of said latch array.

10. The apparatus of claim 1 wherein said lookup table comprises a memory wherein each location of the memory stores a corresponding entry of the multiple entries of the lookup table and wherein said index value is applied as an addressing input to the memory to access a corresponding location of said memory.

11. A system comprising:
a shared resource;
a plurality of channels;
an arbiter coupled to each of said plurality of channels and coupled to said shared resource to coordinate access by said plurality of channels to said shared resource wherein said arbiter includes:
a predicate computation element associated with each channel of said plurality of channels for generating an index value for said each channel as a function of input signals applied to the predicate computation element representing operating attributes of said system;
a channel selection element coupled to each said predicate computation element to receive the index value generated by each predicate computation element and adapted to select a next channel to be granted access to said shared resource based on said index value generated by the predicate computation element associated with said each channel; and
a lookup table coupled between each said predicate computation element and said channel selection element to translate the index value determined by each said predicate computation element to a priority value wherein the lookup table has multiple entries each storing a priority value and each associated with a corresponding index value such that application of said index value to the lookup table selects one of the multiple entries to thereby generate said priority value, wherein said channel selection element selects said next channel based on said priority value of each said channel.

12. The system of claim 11 wherein said lookup table comprises a register array and wherein said index value is applied as a selection input to the register array to select a corresponding register of said register array.

13. The system of claim 11 wherein said lookup table comprises a latch array and wherein said index value is applied as a selection input to the register array to select a corresponding latch of said latch array.

14. The system of claim 11 wherein said lookup table comprises a memory and wherein said index value is applied as an addressing input to the memory to access a corresponding location of said memory.

15. In a system having an arbiter coupling a plurality of channels to a shared resource to coordinate access to said shared resource by said plurality of channels, a method for improved flexibility in arbitration comprising the steps of:
evaluating at least one attribute of said system wherein the step of evaluating includes sensing the present state of signals in the system associated with present operation of said each channel and wherein the attribute is determined in accordance with the sensed signals associated with present operation of said each channel;
determining an index value for each channel of said plurality of channels according to a predicate function of said at least one attribute;
using said index value with a lookup table to determine a priority value corresponding to said index value wherein the lookup table has multiple entries each storing a priority value and each associated with a corresponding index value such that application of said index value to the lookup table selects one of the multiple entries to thereby generate said priority value; and
selecting a next channel of said plurality of channels to receive access to said shared resource in accordance with each said priority value.

16. The method of claim 15 wherein a predicate function is associated with each channel of said plurality of channels and wherein the step of determining comprises the step of:
determining an index value for said each channel according to a predicate function corresponding to said each channel.

* * * * *